United States Patent [19]

Hwang et al.

[11] Patent Number: 5,554,087

[45] Date of Patent: Sep. 10, 1996

[54] TOOL PIVOTING MECHANISM OF A TOOL MAGAZINE

[75] Inventors: Yaw-Der Hwang, Taipei; Jyh-Jone Lee, Tainan City, both of Taiwan

[73] Assignee: Industrial Technology Research Institute, Hsinchu Hsien, Taiwan

[21] Appl. No.: 340,601

[22] Filed: Nov. 15, 1994

[51] Int. Cl.⁶ .................................................. B230 3/155
[52] U.S. Cl. ............................................ 483/62; 483/65
[58] Field of Search ................................ 483/39, 65, 62, 483/68, 60

[56] References Cited

U.S. PATENT DOCUMENTS

| | | | |
|---|---|---|---|
| 3,760,491 | 9/1973 | Zankl et al. | 483/65 X |
| 4,117,586 | 10/1978 | Uchida et al. | 483/65 X |
| 4,296,541 | 10/1981 | Tsuboi et al. | 483/39 X |
| 4,404,728 | 9/1983 | Isaikawa | 483/65 X |

FOREIGN PATENT DOCUMENTS

| | | | |
|---|---|---|---|
| 136750 | 6/1986 | Japan | 483/65 |
| 120935 | 5/1987 | Japan | 483/39 |
| 86436 | 4/1991 | Japan | 483/65 |

*Primary Examiner*—William Briggs
*Attorney, Agent, or Firm*—W. Wayne Liauh

[57] ABSTRACT

A tool pivoting mechanism of a tool magazine for a machining center uses a pressure cylinder as an actuating means to drive a cam mechanism. The cam mechanism composes of a cam set means which moves a roller on a tool pivoting block up or down along a guiding raft, thus drives a tool pot and a cutting tool to rotate. Through the curvature change of the cam curve, the pivoting mechanism controls the displacement, velocity and acceleration of tool pivoting block, thus prevents the impact force of tool pivoting and avoids the falling off of cutting tool.

12 Claims, 7 Drawing Sheets

TOOL PIVOTING MECHANISM OF A TOOL MAGAZINE

BACKGROUND OF THE INVENTION

This invention relates to a tool pivoting mechanism of a tool magazine for a machining center. In a conventional vertical machining center, there is generally a tool magazine to hold a variety of cutting tools. A disk type tool magazine and a chain type tool magazine are two of the most commonly used types. Whether it is a disk type or a chain type tool magazine, the tools held in the tool magazine are usually at a direction of 90 degrees angle against the main spindle. Therefore, before the changeover of a cutting tool, the tool must be rotated 90 degrees downward and parallel to the main spindle. Then, a tool transfer arm exchanges the tool in the main spindle with a tool in the tool magazine for the next step machining. The action of rotating a tool in the tool magazine downward for 90 degrees is generally called tool pivoting.

Referring to FIGS. 1 to 3, in a conventional vertical machining center tool (A) held in the tool magazine is disposed at 90 degrees against the main spindle (B). When there is a need to change a tool, tool (A) in the tool magazine must be pivoted 90 degrees and made parallel with the main spindle (B), then an automatic tool changer (C) and a tool transfer arm (D) are employed to exchange the pivoted tool with the tool in the main spindle (B).

Referring to FIGS. 4 and 5 for a conventional tool pivoting mechanism, a pressure cylinder (E) (pneumatic cylinder or hydraulic cylinder) directly actuates a tool pivoting block (F) which has a groove to allow a roller (H) to pass through. The roller is attached to one end of the tool pot (G) so that they can move together. During tool pivoting process, pressure cylinder (E) moves tool pivoting block (F) up or down, whereby roller (H) and tool (A) in tool pot (G) rotates 90 degrees by rotary shaft (I). Tool pivoting anchor block (J) and adjustable bolt (K) are used to control the correct angle and position of the pivoting tool.

The conventional tool pivoting mechanism set forth above using the pressure cylinder for actuation cannot precisely control the displacement, velocity, and acceleration of the tool pivoting process. Furthermore, the impact vibration occurred at the two ends of the cylinder displacement cannot be totally abolished by the buffer mechanism. Consequently, whenever the pressure cylinder reaches the end of displacement, a huge impact force usually occurs and makes the tool fall off the tool pot. This creates an unsafe situation which can injure the machining center operator.

SUMMARY OF THE INVENTION

It is accordingly an objective of the present invention to provide a tool pivoting mechanism of tool magazine for a machining center that provides better control of motion characteristics of the tool pivoting process so that the impact during tool pivoting can be totally avoided and the tool fall-off phenomenon can be prevented.

The present invention particularly contemplates to employ an actuating means such as pressure cylinder to drive a transmitting mechanism which composes of cam set means. The cam is used to drive a roller attached to one end of the tool pivoting block for upward or downward movement, whereby the tool pivoting block is moved along a guide rail up or down and subsequently drives the tool pot and tool to pivot. The curve of the cam can be any curve or straight line. The actuating movement generated by a cam can therefore control the rotation displacement, velocity, and acceleration of tool pivoting.

DETAILED DESCRIPTION

Figure 2:
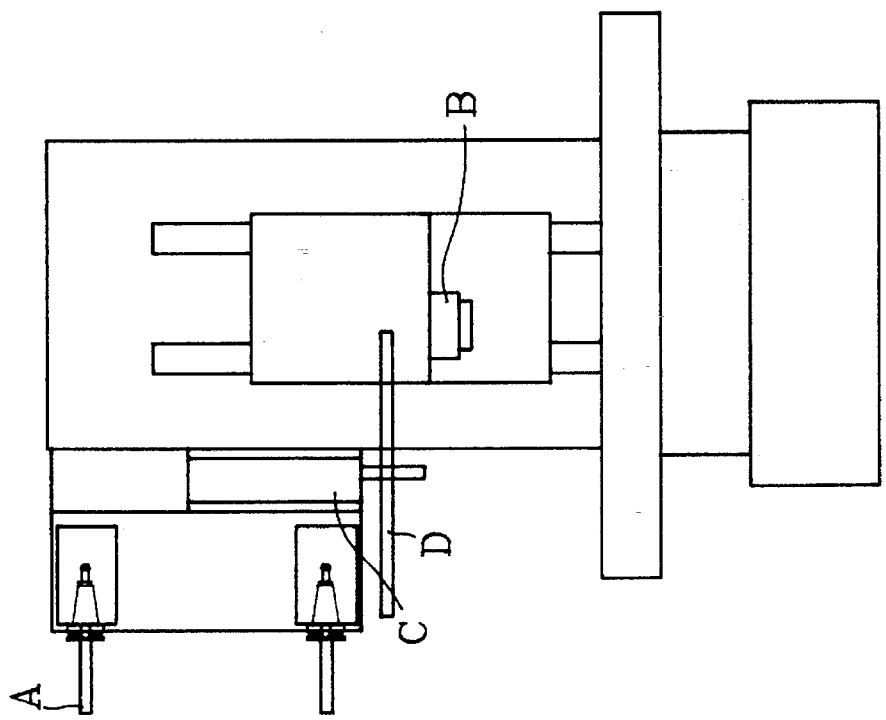
FIG. 2 is a side view of a conventional vertical machining center.
Figure 1:
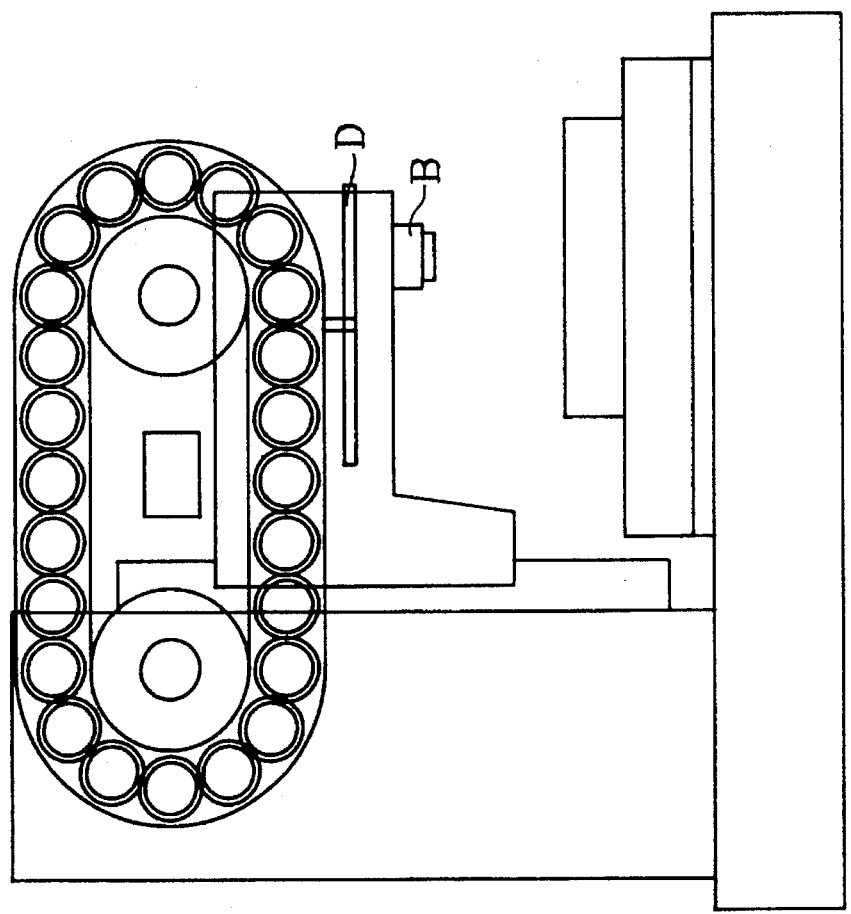
FIG. 1 is a plan view of a conventional vertical machining center.
Figure 4:
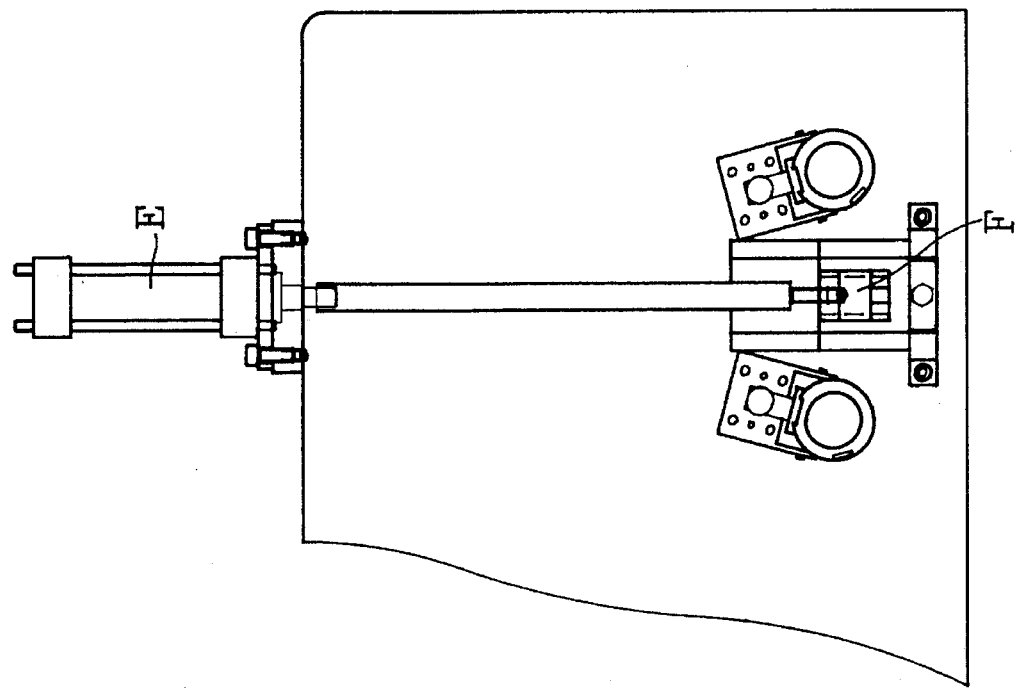
FIG. 4 is a plan view of a tool pivoting mechanism of a conventional vertical machining center.
Figure 3:
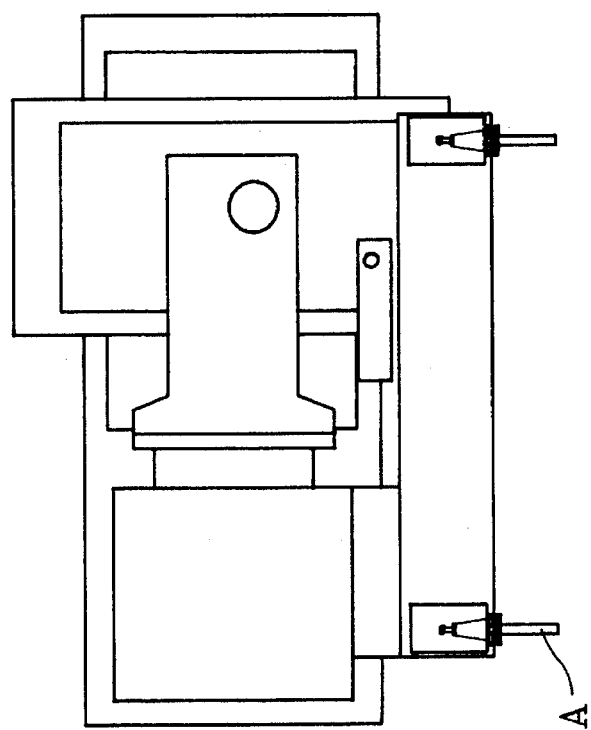
FIG. 3 is a top view of a conventional vertical machining center.
Figure 6:
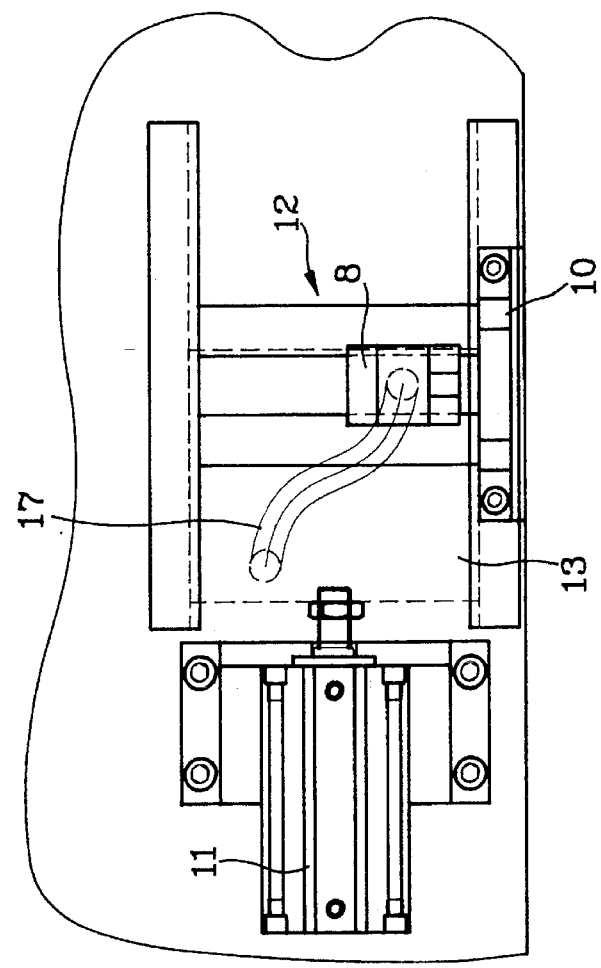
FIG. 6 is a plan view of a tool pivoting mechanism of the present invention.
Figure 5:
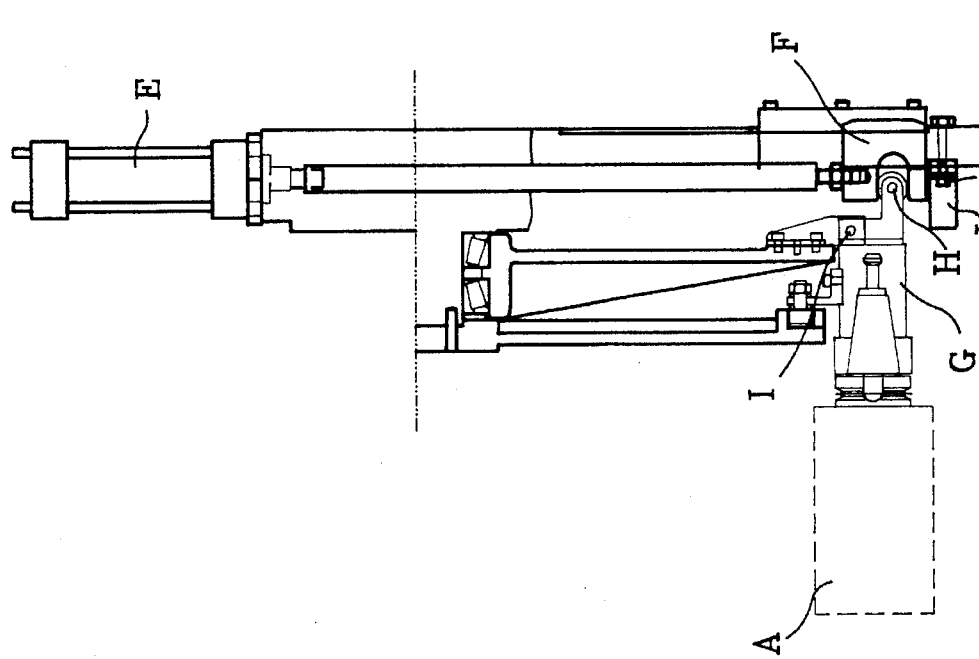
FIG. 5 is a side view of a tool pivoting mechanism of a conventional vertical machining center.
Figure 7:
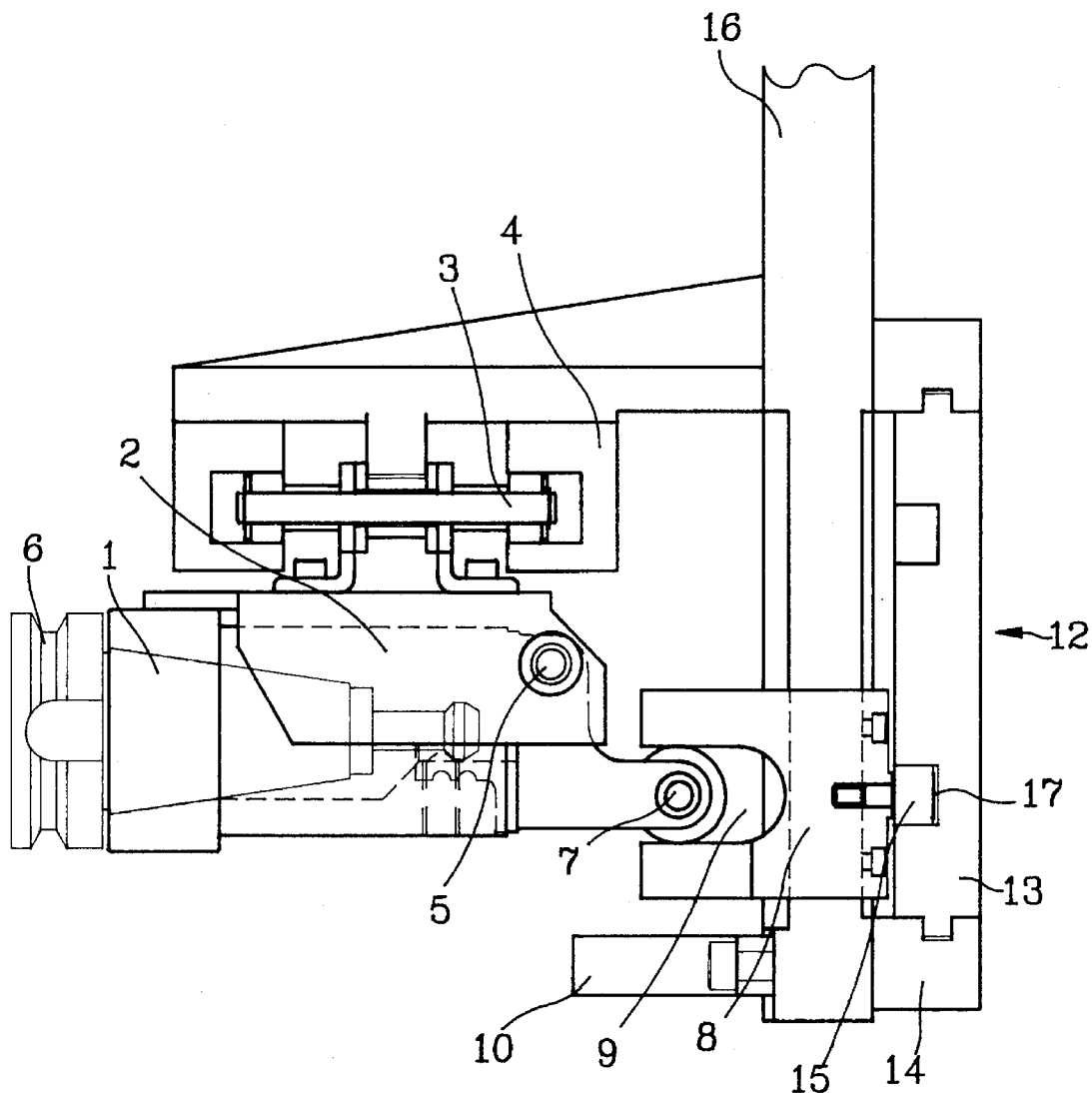
FIG. 7 is a side view of a tool pivoting mechanism of the present invention.
Figure 8:
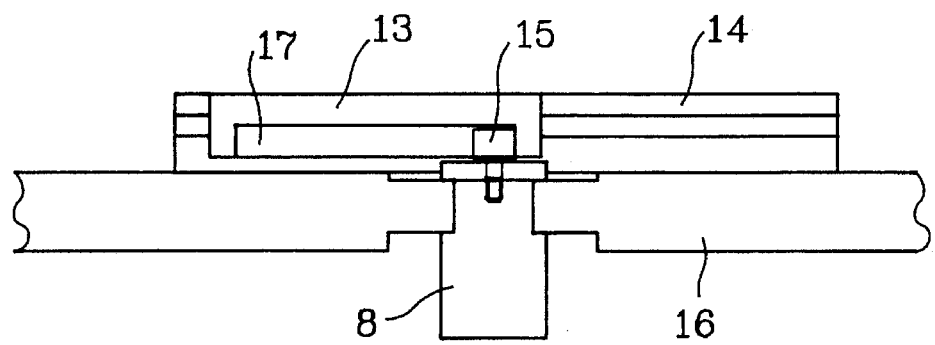
FIG. 8 is a top view of a tool pivoting mechanism of the present invention.

Referring to FIGS. 6, 7 and 8 for an embodiment of a chain type tool magazine of the present invention, the chain of the tool pot composes of a plural number of tool pots (1), tool pot holders (2) and tool pot chains (3). Tool pot chain (3) is driven by a sprocket and moves along the chain rail (4). A set of tool pot holders (2) and tool pot (1) is disposed on every other pitch of the tool pot chain (3).

A tool pot (1) and a tool pot holder (2) are connected by a tool pot rotary shaft (5) which allows a tool pot (1) to rotate.

Inside the tool pot (1), there is a standard slant conical surface at one end to hold a cutting tool (6). At another end of tool pot (1), there is a tool pot roller (1) which passes through a groove (9) of a tool pivoting block (8) when tool pot chain (3) is moved forward or backward. When a tool pot roller (7) of a desired tool is disposed in the middle of groove (9) of tool pivoting block (8), tool pivoting block (8) can be moved up or down, and consequently moves tool pot roller (7) and tool pot (1) to rotate 90 degrees about rotary shaft (5).

After the tool pot rotates downward for 90 degrees, tool pivoting fixing block (10) can be used to set the precise position and angle of the tool pot. The function of tool pivoting fixing block (10) is to rectify the tolerance of the chain sprocket and the tolerance between tool pot (1) and tool pot holder (2). It can also adjust the parallel degree of tool pot (1) and tool (6) against the main spindle in the tool pivoting process. Tool pivoting fixing block (10) is structured like that of a conventional vertical machining center. No further details would be given here.

The present invention further contemplates to equip an actuating means (11) (such as a reciprocal hydraulic or pneumatic cylinder which can generate linear motion) which connects a cam mechanism (12) thereby to move tool pivoting block (8) to perform the tool pivoting process. Cam mechanism (12) composes of a translating cam (13) means which can be moved forward or backward horizontally along the guiding rail (14) by actuating means (11). Translating cam (13) has a groove (17) to house a roller (15) attached at one end of tool pivoting block (8). Tool pivoting block (8) can move only up or down between a pair of guiding channels (16). Therefore, roller (15) of tool pivoting block (8) can only move up or down.

Figure 11:
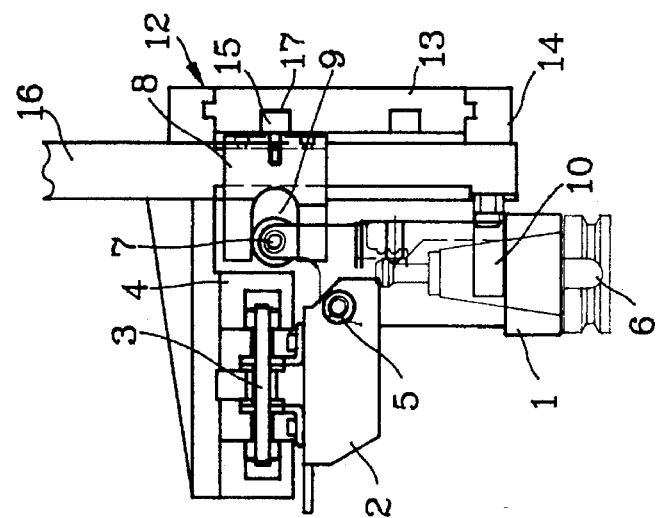
FIGS. 9, 10 and 11 illustrate the continuous movement of a tool pivoting process of the present invention.
Figure 10:
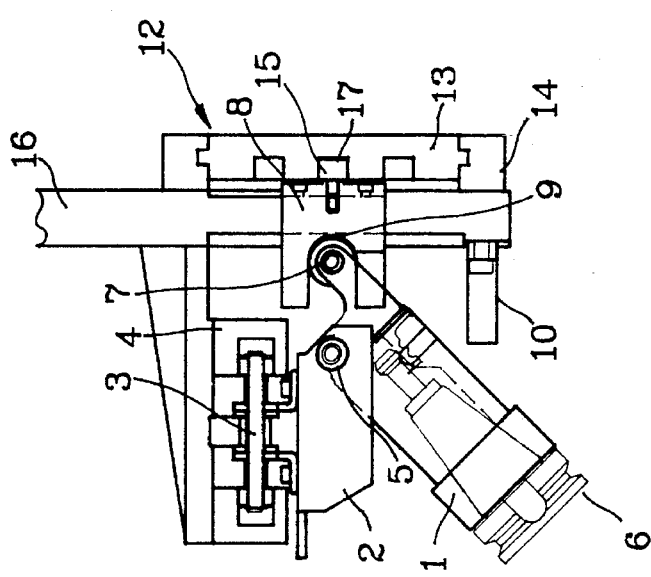
Figure 9:
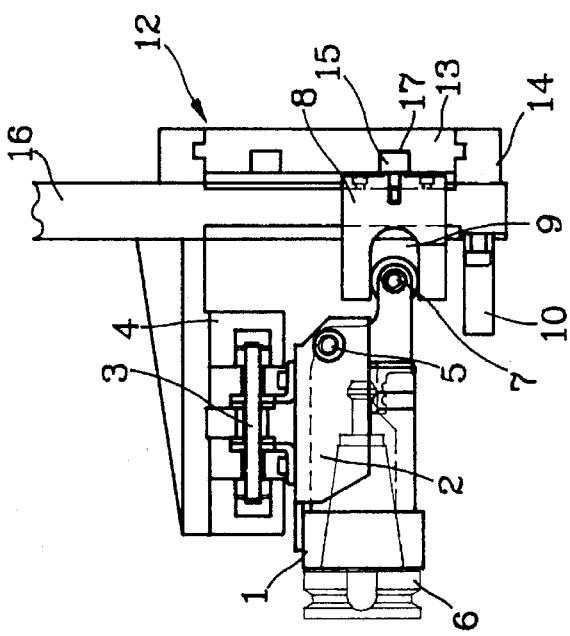

Referring to FIGS. 9 to 11, the sprocket moves tool pot chain (3), tool pot (1) and tool pot roller (7) until a desired tool reaches the pivoting position (i.e. when roller (7) is disposed in the middle of a tool pivoting block (8)) (as FIG. 9 illustrates). The stop signal transmits to a controller which starts which actuating means (11) then moves translating cam (13) along guiding rails (14). Roller (15) and tool pivoting block (8) are also moved upward accordingly (referring to FIG. 10). As tool pot roller (7) is disposed in groove (9) of the tool pivoting block (9), tool pot roller (7), and tool pot (1) are driven to rotate downward for 90 degrees about rotary shaft (5) (referring to FIG. 11). Then tool pivoting fixing block (10) is used to adjust the precise position of tool pot (1), and to make cutting tool (6) in the tool pot (1) extend downward and parallel to the main spindle to facilitate the tool exchange. After the tool change over is completed, the control unit sends a signal to actuating means (11) to move translating cam (13) backward; tool pot (1) and tool (6) are rotated 90 degrees upward. Thus, the tool pivoting and the tool restoration process are completed.

Figure 14:
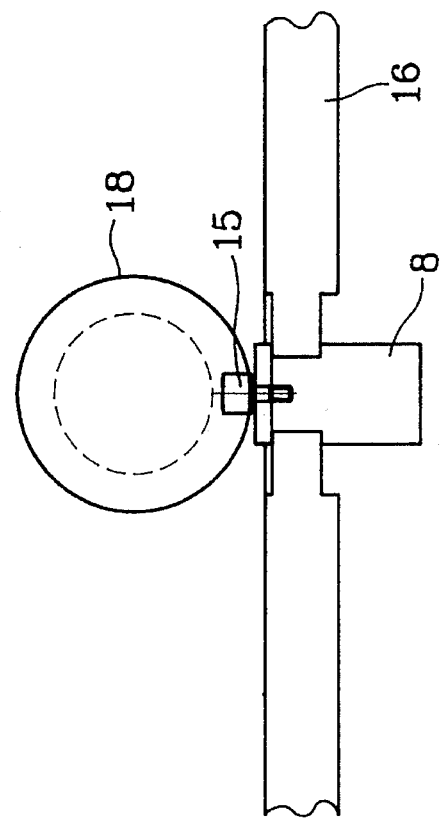
FIG. 14 is a top view of another embodiment of a tool pivoting mechanism of the present invention.
Figure 12:
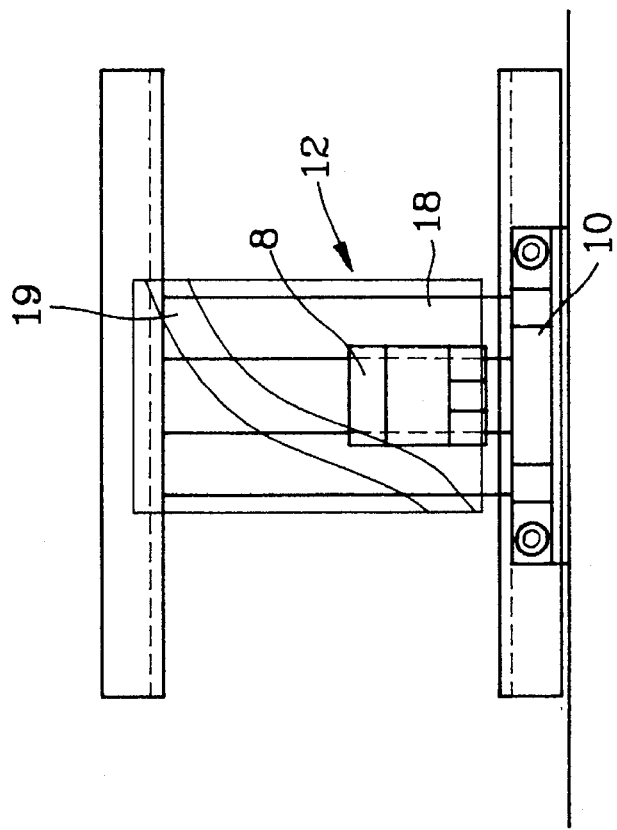
FIG. 12 is a plan view of another embodiment of a tool pivoting mechanism of the present invention.
Figure 13:
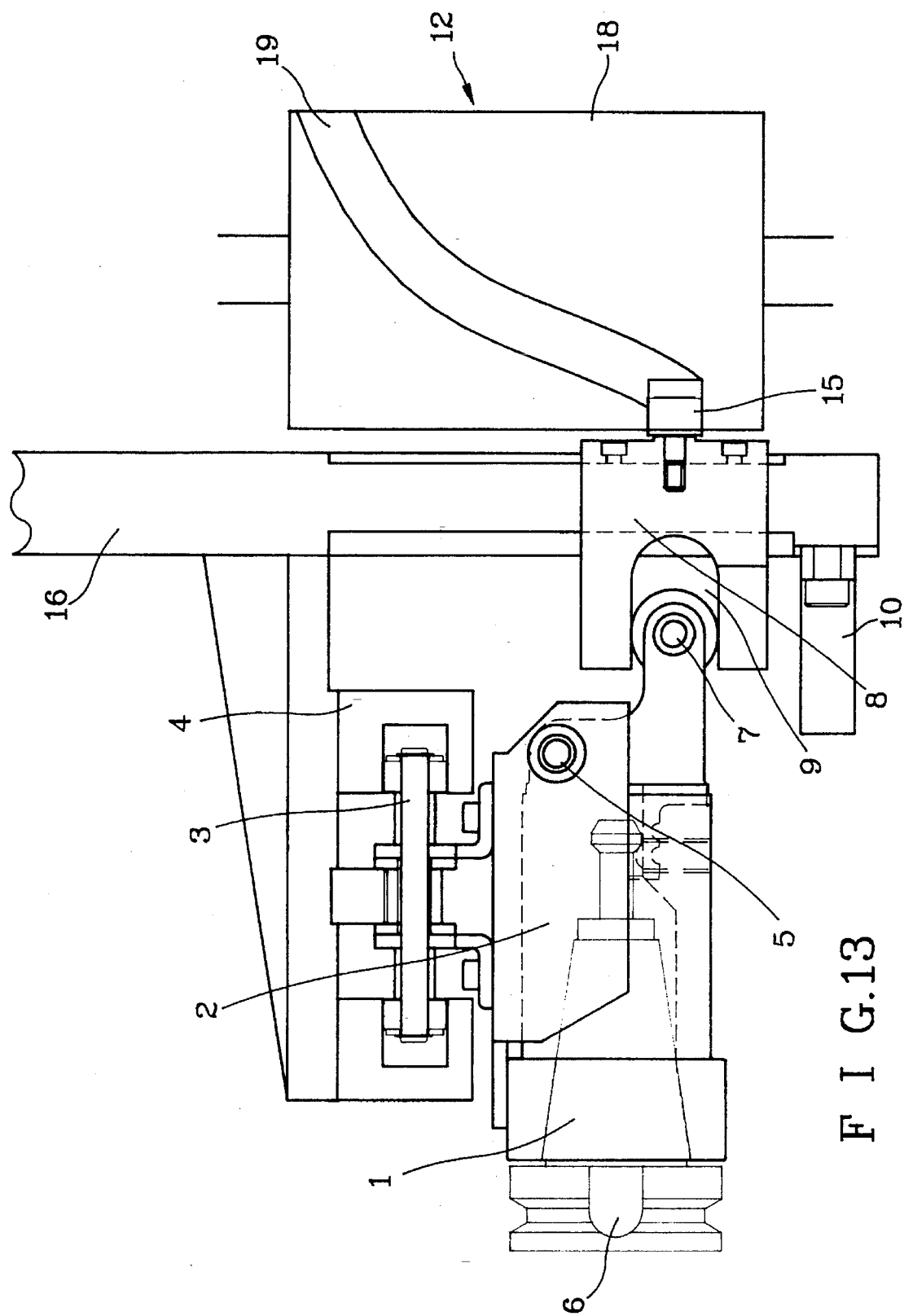
FIG. 13 is a side view of another embodiment of a tool pivoting mechanism of the present invention.

There is no limitation on the type of cam in the cam mechanism (12) of the present invention. Besides the linear translating cam set forth above, it can also be a rotary barrel cam (18) as referring in FIGS. 12 to 14. In that embodiment, barrel cam (18) is driven to rotate by a rotary hydraulic motor or other rotary actuating means. Groove (19) on barrel cam (18) moves roller (15) up or down to trigger the remaining tool pivoting process.

The present invention employs a cam set means in a cam mechanism to move the tool pivoting block. The curve of the cam can be a modified sine, a modified trapezoidal, a modified constant velocity curve, or any other curve which is suitable for this application. Therefore, using the cam set to move the tool pivoting block can effectively control the rotation displacement, velocity, and acceleration of tool pivoting. Thus, the tool pivoting process can be completed in a safer way by utilizing the cam mechanism. In addition, vibration and noise will be reduced to ensure the reliability.

We claim:

1. A tool pivoting mechanism of a tool magazine for a machining center comprising an actuating means, a transmitting mechanism, and a tool pivoting mechanism, said actuating means being provided to connect said transmitting mechanism and said tool pivoting mechanism; wherein said transmitting mechanism comprises a cam set means which drives said pivoting mechanism, further wherein said actuating means is a rotary driving means, and said cam set means is a barrel cam set which drives said tool pivoting mechanism.

2. A tool pivoting mechanism of a tool magazine of claim 1, wherein said actuating means is a linear driving means, and said cam set means is a translating cam set which drives said tool pivoting mechanism.

3. A tool pivoting mechanism of a tool magazine of claim 2, wherein said linear driving means is a reciprocating pressure cylinder.

4. A tool pivoting mechanism of claim 1, wherein said rotary driving means is a rotary actuator.

5. A tool pivoting mechanism of a tool magazine for a machining center comprising:

(a) a tool pivoting block, which has a first groove and is mounted on a guiding channel;

(b) a tool pot assembly, which includes a tool pot and a tool pot holder, wherein said pot holder is hinged to said tool pot by a rotary shaft, said tool pot is capable of holding a machining tool at one end thereof and is coupled with said tool pivoting block at another end thereof by a tool pot roller which is engageable with said first groove of said tool pivoting block;

(c) a translating cam, which has a second groove and is coupled with said tool pivoting block by a roller attached to said tool pivoting block, said roller being received by said second groove in such a manner that said translating cam can be used to drive said tool pivoting block to move along said guiding channel; and (d) means for actuating said translating cam to move linearly; whereby said tool pivoting block can be driven to move a predetermined distance such that said tool pot can be rotated substantially 90 degrees about said rotary shaft in order to pivot said tool pot.

6. A tool pivoting mechanism of a tool magazine as claimed in claim 5 wherein said actuating means is a reciprocating pressure cylinder.

7. A tool pivoting mechanism of a tool magazine as claimed in claim 5 wherein said second groove of said translating cam has a curved configuration.

8. A tool pivoting mechanism of a tool magazine as claimed in claim 7 wherein said curved configuration is selected from the group consisting of a modified sine curve, a modified trapezoidal curve, and a modified constant velocity curve.

9. A tool pivoting mechanism of a tool magazine for a machining center comprising:

(a) a tool pivoting block, which has a first groove and is mounted on a guiding channel;

(b) a tool pot assembly, which includes a tool pot and a tool pot holder, said tool pot holder is hinged to said tool pot by a rotary shaft, said tool pot is capable of holding a machining tool at one end thereof and is coupled with said tool pivoting block at another end thereof by a tool pot roller, said tool pot holder is engageable with said first groove of said tool pivoting block;

(c) a barrel cam, which has a second groove and is coupled with said tool pivoting block by a roller attached to said tool pivoting block, and said roller is received by said second groove in such a manner that said barrel cam can be used to drive said tool pivoting block to move along said guiding channel; and (d) means for actuating said barrel cam to move rotationally; whereby said tool pivoting block can be driven to move a predetermined distance such that said tool pot can be rotated substantially 90 degrees about said rotary shaft in order to pivot said tool pot.

10. A tool pivoting mechanism of a tool magazine as claimed in claim 9 wherein said actuating means is a rotary actuator.

11. A tool pivoting mechanism of a tool magazine as claimed in claim 9 wherein said second groove of said barrel cam have a curved configuration.

12. A tool pivoting mechanism of a tool magazine as claimed in claim 11 wherein said curved configuration is selected from the group consisting of a modified sine curve, a modified trapezoidal curve, and a modified constant velocity curve.

* * * * *